United States Patent [19]
Abersfelder et al.

[11] Patent Number: 5,483,807
[45] Date of Patent: Jan. 16, 1996

[54] DEVICE FOR AIR-CONDITIONING THE PASSENGER COMPARTMENT AND FOR COOLING THE DRIVE SYSTEM OF ELECTRIC VEHICLES

[75] Inventors: Guenter Abersfelder; Helmut Grantz; Wolfgang Odebrecht, all of Sindelfingen, Germany

[73] Assignee: Mercedes-Benz AG, Stuttgart, Germany

[21] Appl. No.: 292,825

[22] Filed: Aug. 19, 1994

[30] Foreign Application Priority Data

Aug. 19, 1993 [DE] Germany ............... 43 27 866.3

[51] Int. Cl.⁶ .................................................. B60H 1/32
[52] U.S. Cl. ........................ 62/435; 62/243; 165/43; 180/65.1; 180/68.2
[58] Field of Search ............... 62/201, 299, 435, 62/244, 239, 243, 430; 237/12.3 B; 165/18, 41, 42, 43; 180/65.1, 68.2

[56] References Cited

U.S. PATENT DOCUMENTS

| | | |
|---|---|---|
| 4,556,171 | 12/1985 | Fukami et al. ............... 237/12.3 B |
| 4,751,967 | 8/1988 | Sumikawa et al. |
| 5,277,038 | 1/1994 | Carr. |
| 5,305,613 | 4/1994 | Hotta et al. ............... 180/65.1 |

FOREIGN PATENT DOCUMENTS 4206611  9/1992  Germany.

Primary Examiner—John M. Sollecito
Attorney, Agent, or Firm—Evenson, McKeown, Edwards & Lenahan

[57] ABSTRACT

A device for air-conditioning the passenger compartment and for cooling the drive system of electric vehicles includes an air-guide duct connected on the inlet and outlet sides to the passenger compartment and having heat exchangers disposed one behind the other therein in the air-flow direction. One of the heat exchangers, which, together with a circulating pump and a cold store, is incorporated within a circuit of a cold-transporting medium. The circuit is run via the evaporator of a refrigeration unit. The other heat exchanger, together with a circulating pump and a heat store, is incorporated within a circuit of a heat-transporting medium. The circuit is run via the drive system of the electric vehicle for vehicle-cooling purposes. With the aim of reducing the weight of the device without altering the storage capacity of the cold and heat stores, these are formed by a single energy store, which, by at least one switchover valve, can be switched alternately into the cold-transporting-medium or heat-transporting-medium circuit. As the cold- and heat-transporting medium, the same liquid transmission medium is used.

19 Claims, 1 Drawing Sheet

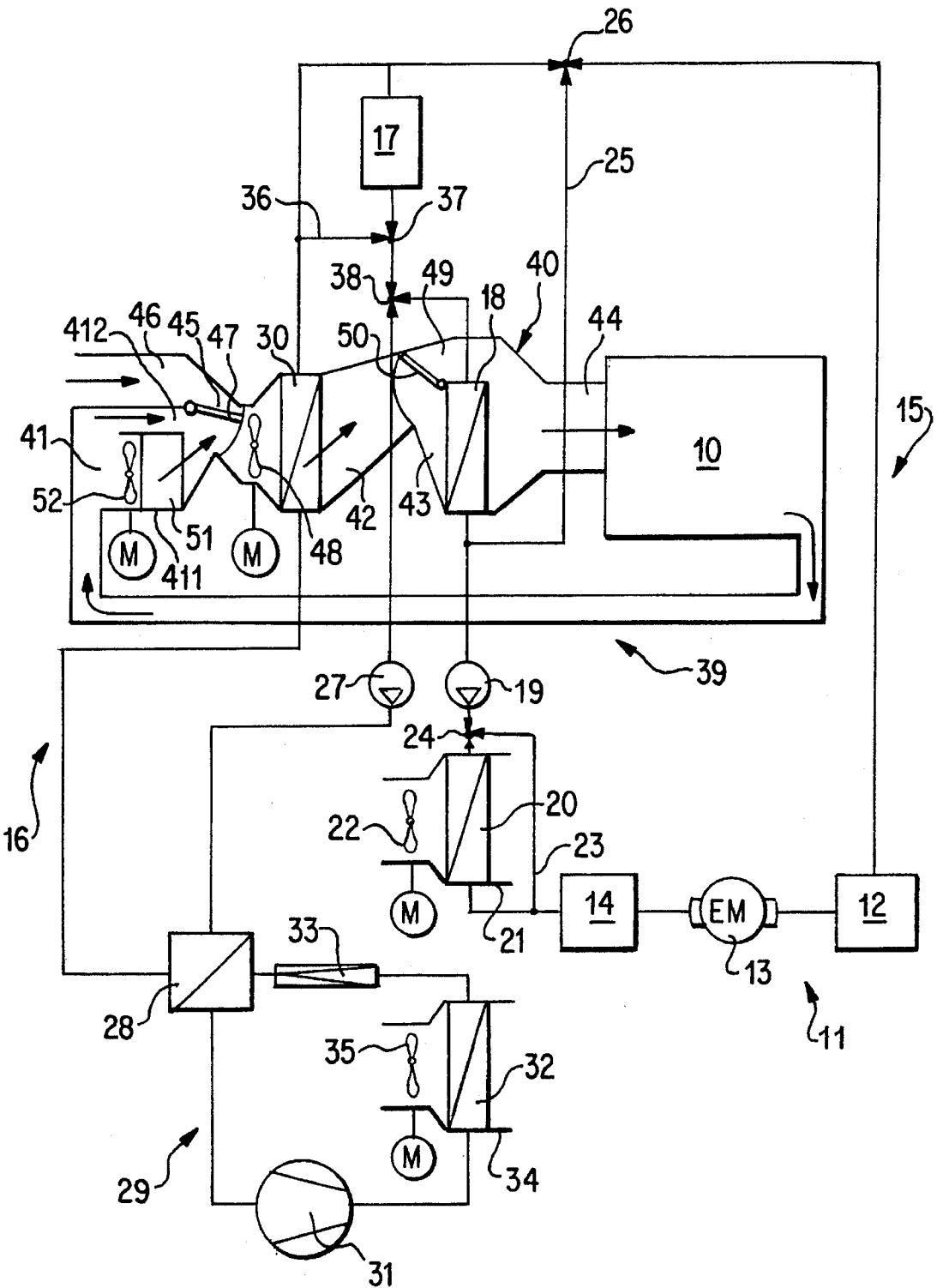

DEVICE FOR AIR-CONDITIONING THE PASSENGER COMPARTMENT AND FOR COOLING THE DRIVE SYSTEM OF ELECTRIC VEHICLES

BACKGROUND AND SUMMARY OF THE INVENTION

The invention relates to a device for air-conditioning the passenger compartment and for cooling the drive system of electric vehicles and, more particularly, to a device having an air-guide duct which is connected on the inlet and outlet sides to the passenger compartment. The duct exhibits a controllable fresh-air opening and contains at least one fan for the generation of an air current in the air-guide duct. The device further has two heat exchangers disposed one behind the other in the air-flow direction in the air-guide duct, one of which, together with a circulating pump and a cold store, is incorporated within a circuit of a cold-transporting medium. The circuit is run via an evaporator of a refrigeration unit. The other heat exchanger, together with a circulating pump and a heat store, is incorporated within a circuit of a heat transporting medium, which circuit is run via the drive system of the electric vehicle for vehicle-cooling purposes.

In vehicles having a combustion engine, the waste heat given off by the combustion engine after the engine has warmed up is greater than the energy requirement needed for heating the vehicle, even on cold winter days. In the case of electric vehicles, although there is also a certain dissipated heat generated in the drive system, comprising an electric motor, transmission, battery and power electronics, the quantity of heat is not sufficient for performing a heating operation under low external temperatures.

It is known from German Patent document DE 42 06 611 A1 to provide in the heat-transporting medium circuit for the heating-specific heat exchanger an additional heat store. The heat store is both heated up whenever the drive battery of the electric vehicle is charged, and takes up excess waste heat from the drive system which is not required for the heating operation. In the event the heating requirement substantially increases, the heat store is called upon, as an additional supplier of heat, to heat up the air supplied to the passenger compartment. In order to save energy, the air is in this case extracted from the passenger compartment in a circulating-air circuit, heated up in an air-guide duct, mixed with fresh air, and fed back to the passenger compartment. For cooling the air in summer operation, the air in the air-guide duct, the heating-specific heat exchanger having been switched off, is guided through a second heat exchanger, which, together with a cold store and the evaporator of a conventional refrigeration unit, is disposed in the circuit of a cold-transporting medium. Here, too, the cold store serves to save energy for the refrigeration unit. This is because when the cold requirement is low, the storage capacity of the cold store is sufficient for air-cooling purposes and obviates the need to switch on the refrigeration unit, with its energy-consuming compressor and condenser.

In the case of electric vehicles, in order to obtain a large journey range in addition to the energy saving in the auxiliary systems, such as the air-conditioning system, a great deal of attention should also be paid to obtaining the lowest possible weight for these auxiliary systems. If heat and cold stores are to possess a sufficiently large storage capacity, then they also together constitute a considerable extra load for the electric vehicle.

There is therefore needed a device for air-conditioning the passenger compartment and for cooling the drive system of electric vehicles, which has a reduced total weight by economizing on heavy structural components.

These needs are met by a device having an air-guide duct which is connected on the inlet and outlet sides to the passenger compartment. The duct exhibits a controllable fresh-air opening and contains at least one fan for the generation of an air current in the air-guide duct. The device further has two heat exchangers disposed one behind the other in the air-flow direction in the air-guide duct, one of which, together with a circulating pump and a cold store, is incorporated within a circuit of a cold-transporting medium. The circuit is run via an evaporator of a refrigeration unit. The other heat exchanger, together with a circulating pump and a heat store, is incorporated within a circuit of a heat transporting medium, which circuit is run via the drive system of the electric vehicle for vehicle-cooling purposes. The cold and heat store is formed by a single energy store, which, by means of at least one switchover valve, can be switched alternately into the cold-transporting-medium or heat transporting-medium circuit, and in that, as the cold- and heat-transporting medium, the same liquid transmission medium is used.

The device according to the present invention has the advantage that, as a result of the union of the cold and heat stores, a saving is achieved both in terms of bulk and in terms of considerable structural weight, i.e. the total device becomes substantially lighter, thereby contributing to an improved energy balance for the electric vehicle and hence to an extension of the vehicle range. Conversely, where the electric vehicle already has a sufficiently large trip range, both the storage capacity of the heat store and the storage capacity of the cold store can be doubled as a result of the common energy store for the cold-transporting-medium and heat transporting-medium circuits. The entire storage capacity of the energy store is fully available in the cold period, during heating operation, as a heat store, and in the hot period, during cooling operation, as a cold store. The capacity of the energy store is thus constantly fully utilized and in no operating mode is there a dead weight present.

According to a preferred embodiment of the invention, the energy store is arranged such that it is connected directly downstream of the heat exchanger in the cold-transporting-medium circuit and directly upstream of the heat exchanger in the heat-transporting medium circuit, in each case viewed in the direction of flow of the transmission medium. In this manner, on the one hand the stored heat energy is directly available for the heating and, on the other hand, the just started-up refrigeration unit with the stored cold is brought to a favorable operating point in a particularly short period of time.

Other objects, advantages and novel features of the present invention will become apparent from the following detailed description of the invention when considered in conjunction with the accompanying drawings.

BRIEF DESCRIPTION OF THE DRAWINGS

The sole drawing is a block diagram of a device for air-conditioning the passenger compartment and for cooling the drive system of an electric vehicle according to the present invention.

DETAILED DESCRIPTION OF THE DRAWINGS

The block diagram drawing represents a device for air-conditioning the passenger compartment 10 of an electric vehicle and for cooling the drive system 11 of the electric vehicle. The device includes a heat transporting-medium circuit 15 and, separated therefrom, a cold-transporting-medium circuit 16. The circuits 15, 16 are run via a common energy store 17 which functions in the heat transporting-medium circuit 15 as a heat store and in the cold-transporting-medium circuit 16 as a cold store. The energy store 17 is referred to as a heat store 17 or cold store 17 in the following description depending upon whether it is described in connection with the heat-transporting-medium circuit 15 or in connection with the cold-transporting-medium circuit 16.

The drive system 11 of the electric vehicle includes, in a known manner, a battery 12, an electric motor 13 fed by the battery 12, and power control electronics 14. In order to evacuate the waste heat which is generated in the drive system 11, the heat transporting-medium circuit 15 is run via the battery 12, electric motor 13 and power control electronics 14 and takes up the waste heat. In the heat-transporting medium circuit 15, there is further disposed, in addition to the heat store 17, a heating-specific heat exchanger 18, a circulating pump 19 and a cooler 20. The cooler 20 allows fresh air to flow through the cooler 20 and is disposed for this purpose in the outlet socket 21 of a cooling fan 22. By means of a bypass 23, which can optionally be opened up or closed by a bypass valve 24 connected upstream of the cooler 20, the cooler 20 can be short-circuited, so that the heat-transporting medium flows past it.

The heating-specific heat exchanger 18 is connected directly downstream of the heat store 17 in the heat-transporting medium circuit 15. The series connection of the heat store 17 and heating-specific heat exchanger 18 is able to be bridged by a second bypass 25. For this purpose, there is disposed in the heat-transporting medium circuit 15, in front of the heat store 17, a bypass valve 26 for controlling the bypass 25, from which bypass valve 26 the bypass 25 emerging behind the heating-specific heat exchanger 18 in the heat-transporting-medium circuit 15 emanates.

The cold-transporting-medium circuit 16 contains in addition to the cold store 17, in the stated sequence, a circulating pump 27, an evaporator 28 of a refrigeration unit 29 and a cooling-specific heat exchanger 30. The evaporator 28 of the refrigeration unit 29, which evaporator is configured as a heat exchanger between two liquid media (liquid-liquid heat exchanger), is thus flowed through both by the cold-transporting medium in the cold-transporting-medium circuit 16 and by the refrigerant in the refrigerant circuit of the refrigeration unit 29. The refrigeration unit 29 exhibits, in a known manner, a compressor 31, a condenser 32, an expansion valve 33 and the evaporator 28, which are disposed, in the stated sequence in the refrigerant circuit. The condenser 32 is bombarded with air and is disposed for this purpose in the outlet socket 34 of a fan 35.

The energy store 17 can be short-circuited by means of a bypass 36 both in the cold-transporting-medium circuit 16 and in the heat-transporting-medium circuit 15. The bypass 36 connects the outlet and inlet of the energy store 17. This bypass 36 is controlled by a switchover valve 37 at the outlet of the bypass 36 or of the energy store 17. For optionally incorporating the energy store 17 as a heat store into the heat-transporting-medium circuit 15 or as a cold store into the cold-transporting-medium circuit 16, there is disposed between the switchover valve 37 and the circulating pump or the heating-specific heat exchanger 18 a three-way valve 38. To one inlet of the three-way valve 38 there is connected the outlet of the switchover valve 37 and to a first outlet there is connected the inlet of the circulating pump 27 and to a second outlet there is connected the inlet of the heating-specific heat exchanger 18. Depending on the setting of the three-way valve 38, the heat-transporting-medium circuit 15 or the cold-transporting medium circuit 16 is closed. As the heat- and cold-transporting media, the same liquid transmission medium is used. The energy store 17 exhibits a large number of small, water-filled plastic balls, which are bathed by the transmission medium flowing through it.

The two heat exchangers 30 and 18, i.e. the cooling-specific heat exchanger 30 and, following there upon, the heating-specific heat exchanger 18, are disposed one behind the other, viewed in the air-flow direction, in an air-guide duct 39. The air-guide duct 39 is connected on the inlet and outlet sides to the passenger compartment 10. The air-guide duct 39 contains an air-conditioning box 40, which is divided into various housing sections. Therein, a circulating-air housing 41, which is connected on the inlet side to the passenger compartment 10, is followed by a refrigeration housing 42. The housing 42 is adjoined by a heating housing 43 which emerges in an air-distributor housing 44 connected on the outlet side to the passenger compartment 10. On the inlet side there is provided in the refrigeration housing 42 a fresh-air opening 45. The opening 45 forms the outlet of a fresh-air housing disposed parallel to the circulating-air housing 41. The fresh-air opening 45 and the outlet opening of the circulating-air housing 41 are controlled by an air diverter 47, which, depending on the setting of the circulating air flowing out of the circulating-air housing 41 into the refrigeration housing 42, adds a regulable fresh-air component.

The cooling-specific heat exchanger 30 is disposed in the refrigeration housing 42, covering the entire cross-section of its air passage. In front of the cooling-specific heat exchanger 30, in the air-flow direction, there is disposed a fan 48. The heating-specific heat exchanger 18 is disposed in the heating housing 43. Above the heating-specific heat exchanger 18 there is provided, in the heating housing 43, a bypass duct 49. The bypass duct 49 is controlled by a warm-air flap 50. The warm-air flap 50, in its one swivel end setting, fully closes off the bypass duct 49, so that all of the air flows through the heating-specific heat exchanger 18, and, in its other swivel end setting, fully partitions off the heat exchanger 18, so that all of the air, in circumventing the heating-specific heat exchanger 18, flows through the bypass duct 49.

The circulating-air housing 41 exhibits two parallel air ducts 411 and 412. In the air duct 411 there is disposed an air drier 51, which covers the entire cross-section of the air passage of the air duct 411. The air drier 51 is filled with zeolite, which extracts moisture from the circulating air flowing through the air drier 51. In the air current in front of the air drier 51 there is disposed a fan 52.

The above described device for air-conditioning the passenger compartment 10 and for cooling the drive system 11 of the electric vehicle operates, in the different operating modes, in the following manner.

Heating operation

In the heating operation, the heat store 17 is in series with the heating-specific heat exchanger 18 and the drive system 11. The heat store 17 can be flowed around in parallel via the bypass 36 and the switchover valve 37, provided that it does not need to be unloaded or loaded. The heat store 17 and the heating-specific heat exchanger 18 can be flowed around in parallel via the bypass 26 and the bypass 25, provided that no heating energy is required in the heating operation and the heat store 17 also does not need to be loaded.

The heat energy is supplied to the passenger compartment 10 by the air flowing via the air-guide duct 39. The air, identified by arrows, which flows out of the passenger compartment 10 is sucked up by the fan 48 into the circulating-air housing 41. When the air humidity is high, the fan 52 pumps part of the circulating air through the air drier 51, whilst the residual component flows through the air duct 412 past the drier 51. At the same time, by means of the air diverter 47, fresh air is mixed in with the circulating air via the fresh-air opening 45. The size of the admixture depends upon the setting of the air diverter 47. The cooling-specific heat exchanger 30 is out of operation, so that the air flows unchanged from the refrigeration housing 42 into the heating housing 43. Depending on the setting of the warm air flap 50, a lesser or greater part of the air conducted through the heating-specific heat exchanger 18– or, in circumventing the heating-specific heat exchanger 18, through the bypass duct 49, and flows via the distributor housing 44 into the passenger compartment 10. The setting of the warm-air flap 50 herein determines the temperature of the air heated in the heating-specific heat exchanger 18 and flowing into the passenger compartment 10. When the vehicle is running, whenever the heat available from the drive system 11 exceeds the heat requirement in the passenger compartment 10 and the heat store 17 is not fully loaded, the heat surplus is used in each case to load the heat store 17. A suitable setting of the warm-air flap 50 ensures that the supply of heat corresponds to the heat requirement of the passenger compartment 10.

While the battery 12 is being charged at a stationary charging station, the heat store 17 is loaded, via the above-described heat-transporting-medium circuit 15, with waste heat from the battery 12. Since the fan 48 is not in operation during the loading phase, no heat is delivered to the passenger compartment 10, so that the generated heat is used exclusively to load the heat store 17. In addition, while the battery 12 is being charged, the heat store 17 can also be loaded using a separate electrical heating element (not shown).

Where the departure time is known, it is sensible to preheat the passenger compartment 10 for as long as the electric vehicle remains connected to the charging station for the purpose of charging the battery 12, so that at the time of departure the passenger compartment 10 is heated and hence, to the benefit of a greater trip range of the vehicle, no on-board energy is required for the heating. In such a case, the above-mentioned electrical heating element is activated, in good time by means of a preset clock, and the circulating pump 19 and the fan 48 are switched on. The bypass 36 is opened by means of the switchover valve 37 and hence, as the heat store 17 is circumvented, the heating-specific heat exchanger 18 is supplied with heating energy, which it passes on, in turn, to the air flowing through it. The warm-air flap 50 here upon completely closes off the bypass duct 49. Cooling operation In the loaded state, the cold store 17 is filled with ice, which is located in small plastic balls and is flowed around by the cold-transporting medium. The cold-transporting medium circulated by the circulating pump 27 flows via the evaporator 28, the cooling-specific heat exchanger 30 and the cold store 17 back to the circulating pump 27. The cold store 17 can be bridged by means of the switchover valve 37 via the bypass 36, this being necessary if the cold store 17 is not loaded. The cold energy is removed from the conventional refrigeration unit 29 via its evaporator 28. Even without the operation of the refrigeration unit 29, the passenger compartment 10 is able to be cooled for a limited period with cold from the cold store 17. This is sensible if electrical energy needs to be saved in order to benefit the trip range of the vehicle.

The cold is supplied to the passenger compartment 10 once again by the air. The air is again sucked up by the fan 48 via the circulating-air housing 41. The fan 52 in front of the air drier 51 is out of operation. The circulating air mixed with an appropriate quantity of fresh air flows in the refrigeration housing 42 through the cooling-specific heat exchanger 30. The cooled cold air flows through the bypass duct 49, which is fully opened up by the warm-air flap 50, in the heating housing 43 and makes its way unchanged, via the distributor housing 44, into the passenger compartment 10.

During the charging periods of the battery 12 at a stationary charging station, the cold store 17 is loaded, via the cold-transporting-medium circuit 16, with the aid of the switched-on refrigeration unit 29. Loading of the cold store 17 when the vehicle is running is not sensible, since the electrical energy required for this would bring about a reduction in the trip range of the electric vehicle.

Where the departure time is known, it is sensible to precool the passenger compartment 10 for as long as the vehicle remains connected to the stationary charging station. For this purpose, in good time prior to the time of departure, the refrigeration unit 29 is activated, e.g. by means of a clock, and the pump 27 and the fan 48 are switched on. The cooling-specific heat exchanger 30 delivers cold to the through-flowing air and the passenger interior 10 is cooled down. This avoids the cooling cycle for the passenger compartment 10 having to be performed after the start, with an expenditure of on board energy, to the detriment of the trip range.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Device for air-conditioning a passenger compartment and for cooling a drive system of an electric vehicle, comprising:

an air-guide duct which is connected on inlet and outlet sides to the passenger compartment and which exhibits a controllable fresh-air opening and contains at least one fan for the generation of an air current in the air-guide duct;

two heat exchangers disposed one behind the other in the air-flow direction in the air-guide duct;

a circuit of a cold-transporting medium incorporating one of said two heat exchangers together with a circulating pump and a cold store, said circuit being run via an evaporator of a refrigeration unit;

a circuit of a heat-transporting-medium incorporating the other of said two heat exchangers together with a circulating pump and a heat store, said circuit being run via the drive system of the electric vehicle for vehicle-cooling purposes;

at least one switchover valve, wherein said cold and heat stores are formed of a single energy store which, via said at least one switchover valve, can be switched alternately into the cold-transporting-medium or heat-transporting-medium circuits; and wherein said cold- and heat-transporting mediums use the same liquid transmission medium.

2. Device according to claim 1, wherein the energy store is disposed such that it is connected directly downstream of the one heat exchanger in the cold-transporting-medium circuit and directly upstream of the other heat exchanger in the heat-transporting-medium circuit, in each case viewed in a flow direction of the transmission medium.

3. Device according to claim 1, wherein a third heat exchanger, which is flowed through by fresh air and can be bridged by a bypass is disposed in the heat-transporting medium circuit, between the other heat exchanger and the drive system of the electric vehicle.

4. Device according to claim 3, wherein said third heat exchanger is disposed in an outlet socket of a cooling fan.

5. Device according to claim 1, wherein the refrigeration unit includes a compressor, a condenser, an expansion valve and said evaporator configured as a liquid-liquid heat exchanger, disposed in a closed refrigerant circuit, and wherein the condenser is bombarded by fresh air.

6. Device according to claim 5, wherein the condenser is disposed in the outlet socket of a cooling fan.

7. Device according to claim 1, wherein the energy store can be short circuited by a bypass.

8. Device according to claim 7 wherein the bypass for the energy store is constantly open in the cooling operation when the energy store is unloaded, and in the heating operation when the energy store is loaded and when there is no additional heat requirement.

9. Device according to claim 1, wherein the energy store, together with the other heat exchanger, can be bridged in the heat-transporting-medium circuit by a further bypass.

10. Device according to claim 3, wherein the energy store, together with the other heat exchanger, can be bridged in the heat-transporting-medium circuit by a further bypass.

11. Device according to claim 10, wherein when the circulating pump in the cold-transporting-medium circuit is switched on, the further bypass via the energy store and heat exchanger is opened and the bypass via the third heat exchanger in the heat-transporting-medium circuit is closed.

12. Device according to claim 1, wherein the air-guide duct is configured at least partially as an air-conditioning box, which exhibits a circulating-air housing connected on the inlet side to the passenger compartment, a refrigeration housing, which adjoins the said circulating-air housing and receives the heat exchanger disposed in the cold-transporting-medium circuit, a heating housing, which is placed after said refrigeration housing and which receives the heat exchanger disposed in the heat-transporting-medium circuit, and a distributor housing which adjoins said heating housing and which is connected on the outlet side to the passenger compartment, in that the fresh-air opening is disposed in the inlet region of the refrigeration housing and, together with the outlet opening of the circulating-air housing, is controlled by an air diverter, and in that in the heating housing there is disposed a bypass duct, which is controllable by a warm-air flap, for the circumfluence of the heat exchanger disposed in the heating housing.

13. Device according to claim 12, wherein the circulating-air housing includes two parallel air ducts, and wherein in the one air duct there is disposed an air drier.

14. Device according to claim 13, wherein there is respectively placed before the air drier a fan, and before the heat exchanger disposed in the refrigeration housing another fan.

15. Device according to claim 3, wherein in the heating operation and for the loading of the energy store functioning as a heat store, the bypass bridging the third heat exchanger in the heat-transporting-medium circuit is open.

16. Device according to claim 15, wherein the bypass duct in the heating housing is more or less closed by a warm-air flap, during heating operation, depending on the heating requirement, and is fully open for loading the energy store, functioning as a heat store, where there is no heating requirement.

17. Device according to claim 15, wherein upon the heating operation being switched off and when the energy store functioning as a heat store is loaded, the bypass bridging the energy store and the heat exchanger is open and the bypass bridging the third heat exchanger in the heat-transporting-medium circuit is closed.

18. Device according to claim 17, wherein in the cooling operation, the fan connected upstream of the air drier is switched off and the bypass duct in the heating housing is fully opened up by the warm-air flap.

19. Device according to claim 18, wherein the energy store includes a large number of small, water-filled plastic balls, which are bathed by the heat-transmission medium flowing through the energy store.

* * * * *